(12) United States Patent
Mafi

(10) Patent No.: US 10,051,879 B2
(45) Date of Patent: Aug. 21, 2018

(54) AIRFLOW-REGULATED SMOKERS AND METHODS OF USING THE SAME

(76) Inventor: Masoud Mafi, Burlington (CA)

(*) Notice: Subject to any disclaimer, the term of this patent is extended or adjusted under 35 U.S.C. 154(b) by 947 days.

(21) Appl. No.: 13/616,648

(22) Filed: Sep. 14, 2012

(65) Prior Publication Data

US 2013/0011535 A1     Jan. 10, 2013

Related U.S. Application Data

(63) Continuation-in-part of application No. 29/380,414, filed on Dec. 3, 2010, now abandoned.

(51) Int. Cl.
| | | |
|---|---|---|
| *A23L 1/01* | (2006.01) | |
| *A23B 4/052* | (2006.01) | |
| *A47J 37/07* | (2006.01) | |
| *A23L 5/10* | (2016.01) | |

(52) U.S. Cl.
CPC ............ *A23L 1/0135* (2013.01); *A23B 4/052* (2013.01); *A23L 5/17* (2016.08); *A47J 37/0786* (2013.01); *A23L 5/19* (2016.08); *Y02A 40/949* (2018.01)

(58) Field of Classification Search
CPC ......... A23B 4/052; A23L 1/0135; A23L 5/17; A23L 5/19; A47J 37/0786; Y02A 40/949
USPC ........... 426/314, 520; 99/473, 482, 481, 446
See application file for complete search history.

(56) References Cited

U.S. PATENT DOCUMENTS

| | | | | |
|---|---|---|---|---|
| 5,048,406 | A | * | 9/1991 | Cofer ............................... 99/482 |
| 5,193,445 | A | * | 3/1993 | Ferguson ......................... 99/482 |
| 5,782,164 | A | * | 7/1998 | Brintle ............................ 99/330 |
| 6,019,035 | A | * | 2/2000 | Jonas et al. ..................... 99/482 |
| 6,041,695 | A | * | 3/2000 | Kuopus .................. A47J 37/042 126/25 R |
| 6,481,344 | B1 | * | 11/2002 | Green et al. ..................... 99/482 |
| 6,701,829 | B2 | | 3/2004 | Farrow |
| 2003/0213378 | A1 | * | 11/2003 | Farrow .......................... 99/450 |
| 2007/0107607 | A1 | | 5/2007 | Gonzalez |
| 2008/0078374 | A1 | * | 4/2008 | Polkinghorn et al. ........ 126/194 |
| 2008/0163765 | A1 | | 7/2008 | O'Shea |
| 2008/0168979 | A1 | | 7/2008 | Goehring et al. |
| 2008/0257174 | A1 | | 10/2008 | Turner |
| 2010/0218691 | A1 | | 9/2010 | Adams et al. |

OTHER PUBLICATIONS

Tafti, Determining the Mass flow Rate in the Smokerin, Jul. 2012.
Williams-Sonoma, Stainless-Steel Smoker Box, http://www.williams-sonoma.com/products/stainless-steel-smokerbox/, Sep. 2012.

* cited by examiner

*Primary Examiner* — Michele L Jacobson
*Assistant Examiner* — Preston Smith
(74) *Attorney, Agent, or Firm* — Ryan Alley IP

(57) ABSTRACT

Smokers can enclose smoking subjects for production of trapped smoke with limited airflow. Optimal airflow rates and resulting smoking effects can be achieved through smokers. If a smoker has approximately 60 cubic inches volume, four 2-millimeter holes at an air inlet point achieves desired airflow and oxygen consumption in typical fills and cooking temperatures. Smokers may include a lid or other seal or access point to permit placement and enclosure of smoking materials. Smokers are useable with conventional grills and may be shaped to sit on grill racks without blocking desired airflow by grill components or smoking materials. Smokers may include a detachable handle for safer handling and heating.

3 Claims, 3 Drawing Sheets

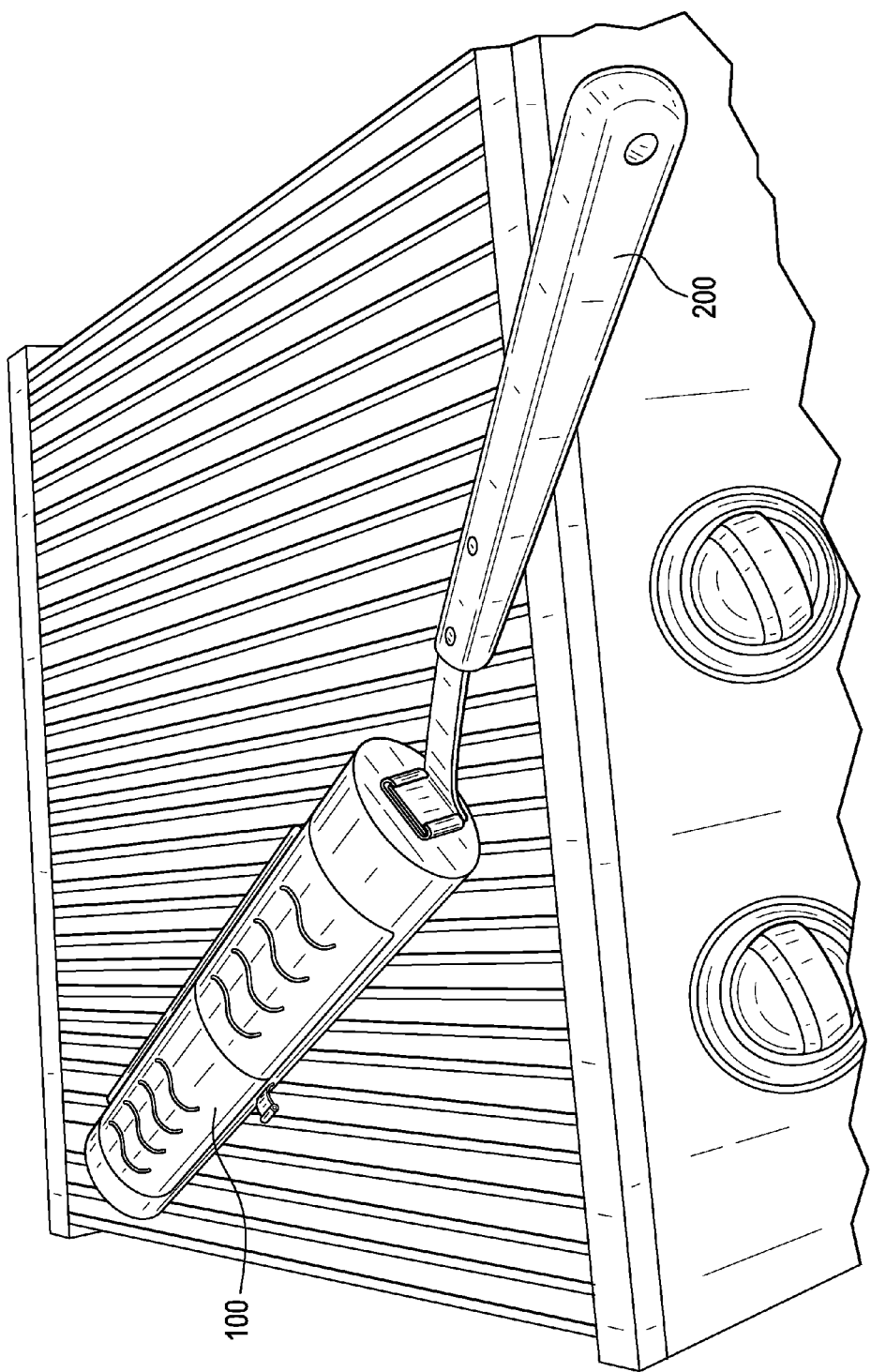

AIRFLOW-REGULATED SMOKERS AND METHODS OF USING THE SAME

PRIORITY STATEMENT

This application is a continuation-in-part of, and claims priority under 35 U.S.C. § 120 to, co-pending application Ser. No. 29/380,414 filed Dec. 3, 2010 titled "Smoker Box with Handle" to Mafi, said co-pending application being incorporated by reference herein in its entirety.

BACKGROUND

Smoking is a known form of preparing food and other organic material wherein smoke, and often heat, are applied for cooking, flavoring, and/or preserving. Smoke can be formed from any combustion source, including a wood or charcoal fire, which may also provide heat, smoking chips or smoldering coals, or from food itself. Produced smoke may be trapped, such as in a smoking box or covered barbeque pit, for example, for exposure to the cooking object, or smoke may be directed onto the cooking object. Given a sufficient smoky atmosphere, organic material, including meats, vegetables, or any other food, can absorb and/or react with ash and incomplete combustion material in the smoke, adding flavor, color, and/or preservation qualities.

Known smoking devices that trap smoke include drum smokers, smoking pits, smoke houses, and smoking boxes. Smoking boxes are conventionally enclosures that can produce their own smoke but use an external heat source, such that they are useable with any ventilated cooking environment, including large commercial heating surfaces or smaller, conventional home charcoal, electric, or gas grills. For example, food and a smoking material, such as wood chips or pellets, can be placed in a smoking box and set on a gas, electric, or charcoal grill to provide heat. The smoking material smokes in the box from the heat, and the box traps the smoke such that the food is sufficiently exposed to the smoke. Conventional smoking boxes can include small openings in the top of the box to allow some rising smoke to escape, preventing any pressure buildup, while trapping the majority of smoke within the smoking box for exposure to food.

SUMMARY

Example embodiments include smokers that can enclose a smoking material, such as pellets or wood chips, in a cavity that produces substantial amounts of smoke that can be exposed to food, while permitting air and oxygen to flow through, and be consumed for combustion in, the smoker in limited amounts, such as only approximately 1.5 E-5 to approximately 3.5 E-5 oxygen grams per second per cubic inch volume of the smoker. The resulting smoking may prohibit full combustion or flaming while producing smoke to fill conventional gas or electric grills or barbeques for smoking food also placed therein. Desired airflow rates can be achieved through natural convection and proper placement of air inlets and exhausts, or through forced airflow mechanisms like blowers. For example, a smoker body of approximately 60 cubic internal inches may include an air inlet of four 2-millimeter holes where the body will contact the cooking surface or applied heat, with opposite exhaust openings. This example may achieve the limited oxygen availability and consumption rate through natural convection in typical cooking situations.

Example methods include smoking food by enclosing food in a smoky environment created by example smokers. For example, a smoking material can be placed in an example embodiment smoker and subjected to a heat source of about 200 degrees Fahrenheit or more. Through control or design, oxygen flow of approximately 1.5 E-5 to approximately 3.5 E-5 grams of oxygen per second per cubic inch internal volume of the smoker can then be achieved through atmospheric or specially directed air. Example methods are useable with conventional grills and other heat sources, and with a variety of foods and smoking materials, including wood chips, pellets, etc. Example methods may further include attaching or removing a removable handle from example embodiments for safe handling.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

FIG. 3 is an illustration of an example embodiment smoker and handle in use.

DETAILED DESCRIPTION

Figure 1:
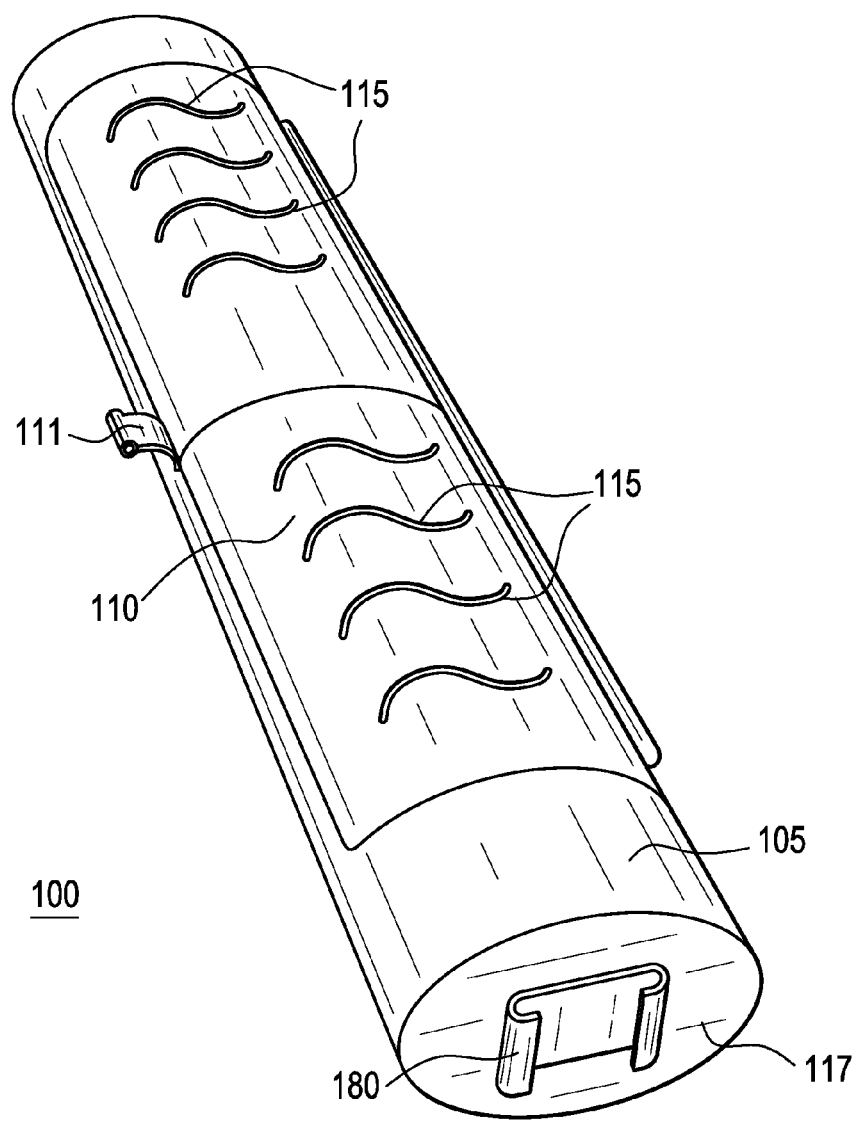
FIG. 1 is an illustration of an example embodiment smoker.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicant has recognized that smoking devices that produce smoke when exposed to a heat source may benefit from an amount of air through-flow, not simply permitting some smoke to escape through top-most openings. Particularly, a limited amount of air and oxygen availability throughout an enclosed smoking box improves oxygen absorption/combustion and smoke availability to food cooked alongside the box, producing improved smoky flavoring and/or appearance. The oxygen availability and consumption rate, however, must be held at a level during normal cooking conditions such that any smoking material will produce and exhaust ample amounts of flavorful smoke while not fully combusting or catching on fire. Through experimentation, Applicant has determined that a maximum oxygen consumption rate between approximately 1.5 E-5 to 3.5 E-5, such as approximately 2.5 E-5, grams of oxygen per second per cubic inch of smoker volume achieves the above-described optimality, resulting in optimal smoke creation from smoking material and outflow into an enclosed cooking space for food flavoring, without catching the smoking material on fire.

Applicants have further recognized that oxygen consumption rates in the optimized range of 1.5 E-5 to 3.5 E-5 g/s/in$^3$ can be achieved through the use of air inlet and proper air inlet and outlet positioning and sizing during typical smoker fill and cooking environments of 200+ degrees Fahrenheit, and up to 600 degrees Fahrenheit. For example, apertures that permit atmospheric air inflow and apertures that permit combustion outflow may be sized and positioned to achieve the optimal oxygen availability and consumption by smoking materials, such as wood chips, in a smoker. Or, for example, a controlled or forced airflow in the optimized range may be directed through example embodiment smokers by forced flow mechanisms such as powered fans and vents or pressurized air sources.

The present invention is a smoking device that permits airflow through a relatively closed environment, and air/smoke outflow into a space where food is smoked, and well as methods of using the same. The airflow rate can be any desired rate, including the above-recognized oxygen rate. An example embodiment smoker is described below, with the understanding that the present invention can be embodied in several other ways and with several other options. For example, embodiments can enclose smoking materials in bodies of any physical layout and dimension to accommodate desired applications, and air flow mechanisms be positioned within or about such bodies in any necessary fashion to produce a desired airflow through a smoker.

Figure 2:
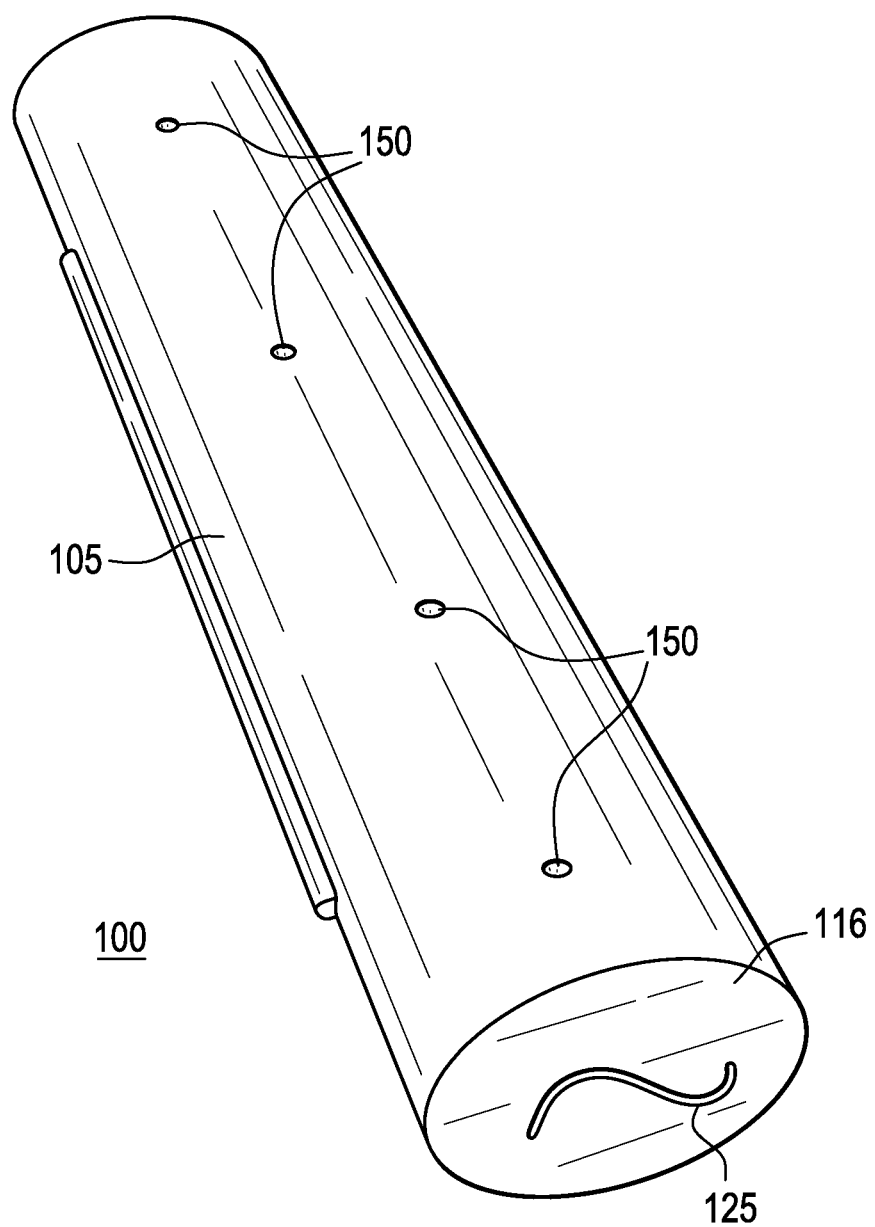
FIG. 2 is an illustration of an example embodiment smoker.

FIGS. 1 and 2 are illustrations of an example embodiment smoker 100. As shown in FIG. 1, example embodiment smoker 100 includes a body 105 that defines a cavity into which smoking materials may be placed and substantially enclosed. Lid 110 may removably join to and enclose body 105; for example, when lid 110 is opened with latch 111 and rotated away from body 105 to which it may be hinged, a user may have access to the cavity inside body 105 to place material within body 105. Although lid 110 is shown hinged and closed against body 105 via latch 111, it is understood that any useable opening can be used to access body 105, including a sliding cover, a screwable lid, a magnetically-attached cover, a body 105 that can be non-destructively disassembled and reassembled or otherwise opened, an access hole, etc.

Body 105 is shown in example embodiment smoker 100 as generally elongate and elliptical/cylindrical, in order to accommodate grilling racks and/or other heating surfaces. Likewise, body 105 can have other shapes and sizes that accommodate smoking materials and heat sources, including prismatic boxes, spheres or obloids, etc. Body 105 can be formed from any materials that are resilient to cooking conditions, including temperatures over 200 degrees Fahrenheit and/or direct flame exposure. For example, body 105 may be formed of a high-temperature glass, steel alloy, aluminum, ceramic composite, etc.

Body 105 may include a first end 117 that includes a handling feature. For example, as shown in FIG. 1, a retainer 180 may removably accept a variety of handling devices that include a prong fitting within retainer 180. As shown in FIG. 3, this may permit example embodiment smoker 100 to be placed in a grill or in an outdoor cooking enclosure, for example, without needing a lengthy handle 200 to remain attached to smoker 100 during heating. Instead, a user may remotely reattach a handle prong to retainer 180 to manipulate smoker 100 as desired without danger from such a handle overheating or interfering with cooking. No or other handling devices are useable with example embodiment smoker 100 as may be needed for various implementations, including insulated hand-holds, permanent extended handles, grasping tools, etc.

Smoker 100 includes at least one exhaust point located where combustion products and/or air through-flow may exit smoker 100 as smoke that fills a cooking area. For example, as shown in FIG. 100, smoker 100 may include several exhaust slits 115 near or on a top of smoker 100. Such exhaust slits 115 may be placed in lid 110, for example, at several points along a length of smoker 100 to permit even through-flow exhausting from body 105. Exhaust slits 115 may take on any shape or size that allows for desired exhausting, including holes, coverable slots, grids or meshes, tubes, etc. Or, for example, a single slit 115, or any other passive or forced exhaust mechanism, can be used with example embodiments.

FIG. 2 is an illustration of a reverse side of example embodiment smoker 100. As shown in FIG. 2, example embodiment smoker 100 may include a second side 116 that may have a side exhaust slit 125 similar to exhaust slits 115 on top of smoker 100. Example embodiment smoker 100 further includes at least one air intake point located where atmospheric or available air flow may enter smoker 100 at a desired rate. For example, as shown in FIG. 2, four inlet apertures 150 may be placed along bottom surface 105 of smoker 100. Because inlet apertures 150 are located at areas where air will flow into smoker 100, sizing and placement of apertures 150 control the ultimate airflow, oxygen availability, and oxygen consumption rate within smoker 100 during typical cooking conditions. If body 105 has an interior volume of 60 in$^3$, for example, four apertures 150 with diameters of approximately 0.079 inches or approximately 2.0 millimeters, will result in an oxygen availability and maximum consumption rate of 0.002 g/s within body 105 when exposed to a cooking surface of 400 degrees Fahrenheit and average fill amounts, resulting in the optimized conditions identified above. Of course, other sizes, locations, and shapes of inlet apertures 150 may be used for differently sized or shaped bodies 105 to achieve desired oxygen consumption rates within other example embodiments using apertures to achieve desired flows.

As shown in FIG. 2, body 105 may include a curved lower surface with inlet apertures 150 positioned about a lowest point of body 105. Such positioning may permit example embodiment smoker 100 to be placed on a conventional grill grid, while contacting at least two grid crossbars, without significantly blocking apertures 150 by grill elements. Similarly, any smoking materials, which can be relatively coarse smoking chips, pellets, etc. placed within body 105 may not rest directly on apertures 150 due to their positioning in curved bottom surface of body 105, such that inlet apertures 150 are not significantly blocked. These features may aid in achieving desired air through-flows to body 105; of course, other shapes, sizes, and/or airflow-ensuring features can be used with body 105 while preserving this functionality.

In use, example embodiment smoker 100 may be loaded with desired smoking materials. For example, several coarse woodchips of a desired flavor may be sealed into body 105 through lid 110. As shown in FIG. 3, smoker 100 is then placed on a heating surface or cooking environment where produced smoke can be trapped and air is available from a heat source, such as a grill or barbecue or cooking pit, for example. As smoker 100 heats to cooking temperatures, the smoking materials being to partially combust and smoke, typically over 200 degrees Fahrenheit, and any foodstuffs begin to cook, including oxidize, pyrolize, denature, etc. Smoke is generally produced at optimal rates in body 105, where it can escape at limited outflows through top exhaust slits 115 to provide ample smoking and flavor to a covered grill or barbecue, for example. Similarly, oxygen in ambient air flows in through inlet apertures 150 at a limited rate of 1.5 E-5 to 3.5 E-5 g/s/in$^3$ (6.5 E-5 to 1.5 E-4 g/s/in$^3$ total air flow) through natural and/or driven convection between inlet apertures 150 and exhaust slits 115, resulting in desired oxygen consumption, exhausting, and/or smoke production for foodstuffs from example embodiment smoker 100. After a desired cooking time, such as when foodstuffs exhibit a safe internal temperature or have a desired smoked appearance, food and/or smoker 100 can be removed from the enclosed smoky environment and the prepared foodstuffs may be consumed.

An example embodiment thus being described, it will be appreciated by one skilled in the art that example embodiments may be varied and substituted through routine experimentation while still falling within the scope of the following claims. For example, although an example embodiment is described with an elongated body that control airflow through sizing and placement of openings, it is understood that example embodiments may include a wide variety of shapes and air-flow controls, including completely sealed boxes having forced oxygen inlets and exhausts as desired rates. Further, it is understood that example embodiments can be used in connection with any type of application where a smoking is useful to provide desired characteristics to a subject. Such variations are not to be regarded as departure from the scope of the following claims.

What is claimed is:

1. A smoker comprising:
a body defining an internal cavity sized to contain a smoking material, wherein,
the body includes at least one air inlet,
the body includes at least one exhaust point, and
the air inlet and the exhaust point are sized and positioned to cause an oxygen flow from the inlet to the exhaust point of approximately 1.5E-5 to approximately 3.5E-5 grams per second per cubic inch volume of the internal cavity by convection when filled with the smoking material of no less than 0.3 porosity in an atmospheric cooking environment of at least 200 degrees Fahrenheit, wherein the oxygen flow rate prevents fire and full combustion of the smoking material when in the smoker
wherein the body is continuous and completely encloses the cavity with the exception of only the exhaust point, the air inlet, and an access point, the smoker further comprising:
a lid that removably encloses the access point; wherein the lid is attached to the body by a hinge and a latch.

2. A smoker comprising:
a body defining an internal cavity sized to contain a smoking material, wherein,
the body includes at least one air inlet,
the body includes at least one exhaust point,
an attachment point configured to receive a removable handle,
and
the air inlet and the exhaust point are sized and positioned to cause an oxygen flow from the inlet to the exhaust point of approximately 1.5E-5 to approximately 3.5E-5 grams per second per cubic inch volume of the internal cavity by convection when filled with the smoking material of no less than 0.3 porosity in an atmospheric cooking environment of at least 200 degrees Fahrenheit, wherein the oxygen flow rate prevents fire and full combustion of the smoking material when in the smoker;
wherein the attachment point includes a retainer having two opposite U-shaped edges that open toward each other, and wherein the U-shaped edges extend vertically on a side between a top and a bottom of the body.

3. A smoker comprising:
a body defining an internal cavity, wherein the body includes at least one air inlet and at least one exhaust point opposite the air inlet in the body to permit flow into and out of the body; and
an air flow mechanism configured to produce an oxygen flow into the body of approximately 1.5E-5 to approximately 3.5E-5 grams per second per cubic inch volume of the internal cavity when the body is filled with the smoking material having at least 0.3 porosity and exposed to at least 200-degree Fahrenheit cooking conditions;
wherein the body is an elliptical cylinder with a major radial axis and a shorter minor radial axis, and wherein the air inlet and the exhaust point are on opposite ends of the minor axis, the smoker further comprising:
a retainer having two opposite U-shaped edges that open toward each other on the major axis, and wherein the retainer is on an end of the body between the air inlet and the exhaust point on the minor axis.

* * * * *